US005762370A

United States Patent [19]
Lindsey et al.

[11] Patent Number: 5,762,370
[45] Date of Patent: Jun. 9, 1998

[54] AUTO IGNITION SYSTEM

[75] Inventors: David W. Lindsey, Ogden; Darrin L. Johnson, Uintah Highlands; Brent K. Olson, Clearfield; J. Kirk Storey, Farmington; William B. Richardson, Kaysville, all of Utah

[73] Assignee: Morton International, Inc., Chicago, Ill.

[21] Appl. No.: 868,030

[22] Filed: Jun. 3, 1997

Related U.S. Application Data

[63] Continuation of Ser. No. 611,797, Mar. 6, 1996, abandoned.

[51] Int. Cl.$^6$ ............................................. B60R 21/26
[52] U.S. Cl. .................................... 280/741; 102/530
[58] Field of Search ............................. 280/741, 736; 102/530, 531

[56] References Cited

U.S. PATENT DOCUMENTS

| | | | |
|---|---|---|---|
| 4,944,528 | 7/1990 | Nilsson et al. | 280/741 |
| 5,100,170 | 3/1992 | Mihm et al. | 280/735 |
| 5,186,491 | 2/1993 | Yoshida et al. | 280/741 |
| 5,253,895 | 10/1993 | Bretfeld et al. | 280/741 |
| 5,308,370 | 5/1994 | Kraft et al. | 55/487 |
| 5,350,193 | 9/1994 | Murashima et al. | 280/741 |
| 5,380,039 | 1/1995 | Emery et al. | 280/741 |
| 5,409,259 | 4/1995 | Cunningham et al. | 280/741 |
| 5,427,030 | 6/1995 | Kidd et al. | 280/741 |
| 5,443,286 | 8/1995 | Cunningham et al. | 280/741 |
| 5,468,017 | 11/1995 | Kirsch et al. | 280/741 |
| 5,533,754 | 7/1996 | Riley | 280/741 |

FOREIGN PATENT DOCUMENTS 4234276C 11/1993 Germany.

*Primary Examiner*—Paul N. Dickson
*Attorney, Agent, or Firm*—George W. Rauchfuss, Jr.

[57] ABSTRACT

An auto ignition system for use as part of an airbag inflator having an ignitor tube. The auto ignition system includes an elongated auto ignition chamber having an open end and a length to width ratio of at least three. The auto ignition chamber is adapted to be positioned within the airbag inflator with the open end facing the ignitor tube. Auto ignition material is contained within the auto ignition chamber, and a metal foil retention disk closes the open end of the auto ignition chamber. According to one embodiment, the auto ignition chamber is a recess defined by an endwall of the airbag inflator with the open end of the recess facing the ignitor tube. According to another embodiment of the invention, a solid press-fit closure plug closes the open end of the auto ignition chamber, and according to an additional embodiment, the press-fit closure plug is a porous metal fiber or powder press-fit closure plug. According to a further embodiment, the auto ignition chamber is defined by a retention cup adapted to be press-fit within the recess defined by the endwall of the inflator.

28 Claims, 4 Drawing Sheets

AUTO IGNITION SYSTEM

This application is a continuation of application Ser. No. 08/611,797, filed Mar. 6, 1996, abandoned.

FIELD OF THE INVENTION

The present invention relates to an auto ignition system for use with an airbag inflator of an airbag module as part of a motor vehicle inflatable restraint system. More particularly, the present invention relates to an auto ignition system having an elongated auto ignition chamber and a metal fiber or powder press-fit closure plug.

BACKGROUND OF THE INVENTION

Airbag modules are part of inflatable restraint systems that are employed in motor vehicles for protecting an occupant against injury by physically restraining the occupant's body when the motor vehicle encounters a collision. The airbag module includes an airbag inflator and an airbag cushion. A pyrotechnic type airbag inflator, which is normally used in passenger side and side impact airbag modules, contains solid gas generant which, upon actuation by a remote collision sensor, produces inflation gas for inflating the airbag cushion. Such an inflator typically includes an aluminum housing, an ignitor tube and an auto ignition device. The ignitor tube is centrally located within the aluminum housing and the auto ignition device is located adjacent an end of the ignitor tube.

The auto ignition device contains an auto ignition material that ignites at about a temperature of 350° F. (177° C.) to create a hot gas/particulate effluent to ignite primary ignition material contained in the ignitor tube, which in turn ignites the gas generant. The auto ignition device prevents operation of the airbag inflator at a high temperature of about 650° F. (343° C.), as would occur if the motor vehicle caught fire, for example. At that temperature, the gas generant will auto ignite while the aluminum inflator housing will tend to weaken, so that the igniting gas generant could cause the inflator housing to rupture or explode. In contrast, upon ignition of the gas generant by the auto ignition device at about a temperature of 350° F. (177° C.), the aluminum of the inflator housing will not weaken and rupture. The auto ignition device, therefore, allows the inflator housing to be made of aluminum instead of steel (which does not weaken at 650° F. (343° C.)), resulting in a significant weight reduction. Such auto ignition devices are disclosed in U.S. Pat. No. 4,561,675 and U.S. Pat. No. 5,378,017, both assigned to the assignee of the present invention.

The hot gas/particulate effluent or flame front created by an existing auto ignition device generally does not have a long range. In order to ensure proper functioning, the end of the ignitor tube must be positioned very close to, and generally touching, the auto ignition device to allow the flame front to reach the seal at the end of the ignitor tube. This close positioning requires a tight assembly tolerance which increases production costs. In fact, a locator cap is normally attached to the end of the ignitor tube to help position the end of the ignitor tube close to the auto ignition device. Accordingly, there is a need for an auto ignition system that does not require the end of the ignitor tube to be positioned directly adjacent the auto ignition device.

Many auto ignition devices use nitrocellulose-base gun powders for an auto ignition material. These materials, however, tend to self-degrade and have a shorter life than preferred when contained in a gas-tight, heated environment and not allowed to release degrading gas effluent or "breath". The powder auto ignition material is also made up of small, very fine granules or particles that are very difficult to contain without leakage. A metal wire mesh retention disk allows the auto ignition material to breath, but may also allow the small, very fine granules or particles of the powder auto ignition material to leak. At the very least, the use of screen or mesh may restrict the smallest size of the particles, placing limits on the design and manufacture of the auto ignition material. On the other hand, a solid metal foil retention disk does not allow the powder auto ignition material to leak, but also does not allow the auto ignition material to breath. There is also a need, therefore, for a retention disk or closure plug for use with an auto ignition device that prevents leakage of the small very fine granules or particles of the powder auto ignition material yet allows the auto ignition material to breath, thereby extending the useful life of the auto ignition material.

The primary ignition material contained within the ignitor tube is also made up of small, very fine granules or particles that are very difficult to contain without leakage. During ignition of the auto ignition device, the resulting hot gas/particulate effluent burns through a seal at the end of the ignitor tube to ignite the primary ignitor material. The seal is made of a metal mesh weave or screen in order to ensure that the hot effluent or flame front will pass through. But again, the mesh or screen may not contain the small, very fine granules or particles of the powder primary ignition material as well as a metal foil disk or other similar solid seal, and may place limits on the size of the smallest particles. There is an additional need, therefore, for an auto ignition system that allows the use of a solid seal at the end of the ignitor tube in order to effectively contain the powder primary ignition material.

SUMMARY OF THE INVENTION

An object of the present invention is to provide an auto ignition system for an airbag inflator that does not require an end of an ignitor tube of the inflator to be positioned directly adjacent the auto ignition device.

Another object of the present invention is to provide a retention disk or closure plug for use with an auto ignition device that prevents leakage of small, very fine granules or particles of powder auto ignition material contained within the auto ignition device, yet allows the auto ignition material to breath.

An additional object of the present invention is to provide an auto ignition system that allows the use of a solid seal at an end of an ignitor tube of an airbag inflator in order to effectively contain powder primary ignition material within the ignitor tube.

In meeting one or more of the above objects there is provided an auto ignition system for use as part of an airbag inflator containing gas generant. The auto ignition system comprises an elongated auto ignition chamber having an open end. Auto ignition material is contained within the auto ignition chamber for producing a hot gas/particulate effluent upon auto ignition, and closure means closes the open end of the auto ignition chamber. The auto ignition chamber is sufficiently elongated to create a shotgun effect for the hot gas/particulate effluent, giving the hot effluent a greater range than hot effluent produced by existing auto ignition devices. The auto ignition system of the present invention, therefore, does not require a tight assembly tolerance between the gas generant of the inflator and the auto ignition system to ensure that the hot effluent will reach the gas generant.

3

According to an aspect of the present invention, the elongated auto ignition chamber has a length to width ratio of at least three.

According to one aspect of the present invention, the elongated auto ignition chamber comprises an elongated recess defined by an endwall of an inflator housing of the airbag inflator.

According to another aspect of the present invention, the closure means is a solid metal foil retention disk that does not allow leakage of the auto ignition material. According to an additional aspect of the present invention, the closure means comprises a solid press-fit closure plug that also does not allow leakage of the auto ignition material. According to a further aspect of the present invention, the closure means comprises a porous metal fiber or powder press-fit closure plug that does not allow leakage of the fine powder of the auto ignition material, yet allows escape of degrading gas effluent from the enclosed auto ignition material.

According to still another aspect of the present invention, the elongated auto ignition chamber comprises an elongated retention cup adapted to be press-fit within the elongated recess defined by the endwall of the inflator housing.

The retention cup aids automated assembly of the auto ignition system to the airbag inflator.

The invention together with further objects, features, advantages and aspects thereof, will be more clearly understood from the following description taken in connection with the accompanying drawings.

BRIEF DESCRIPTION OF THE DRAWINGS

The same reference numerals refer to the same elements throughout the various figures.

DETAILED DESCRIPTION OF THE INVENTION

Figure 1:
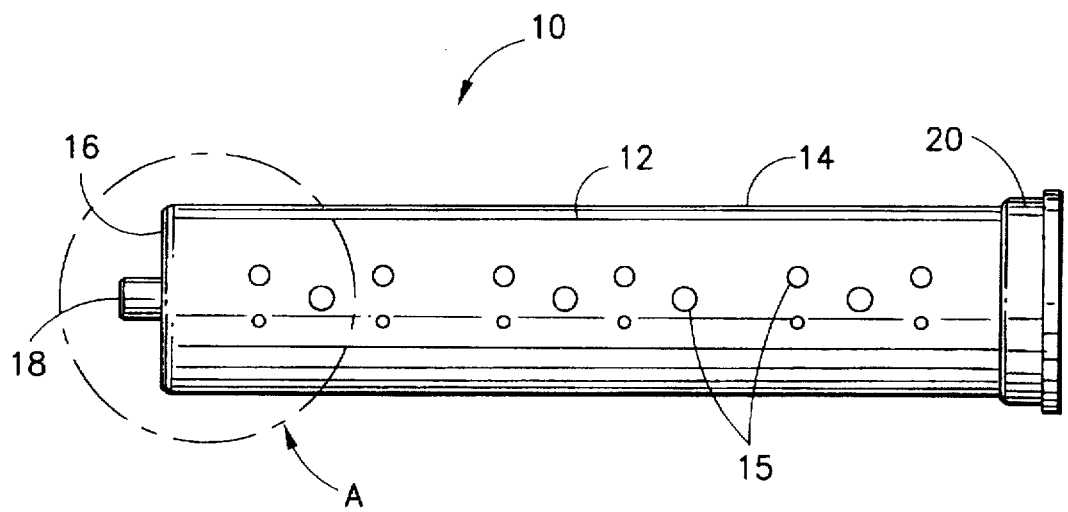
FIG. 1 is a side elevation view of a prior art airbag inflator.
Figure 2:
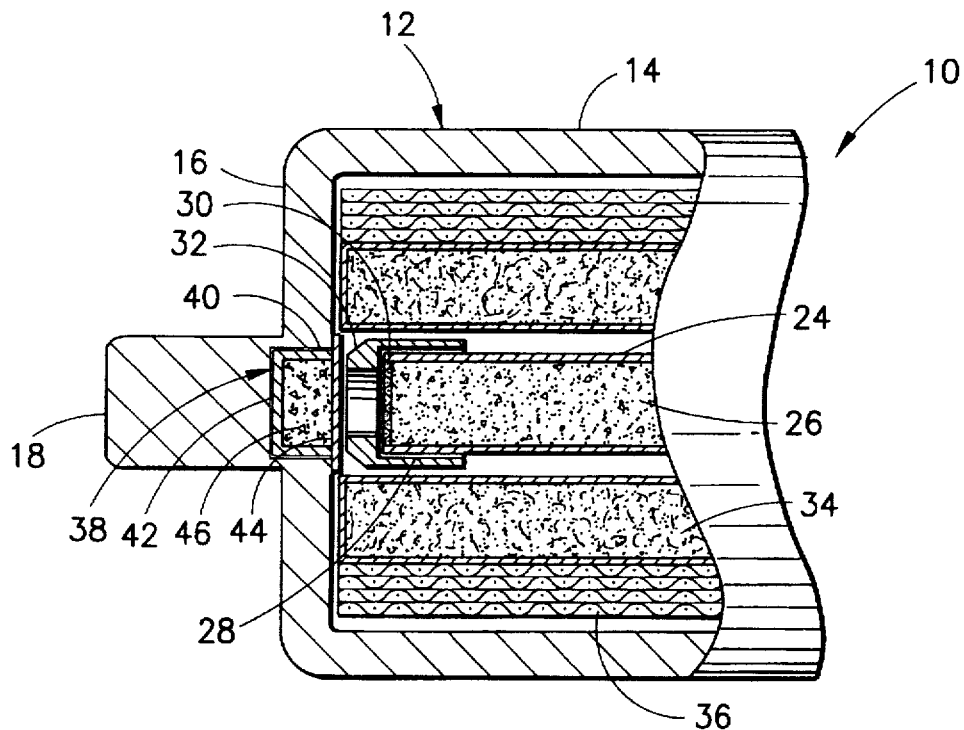
FIG. 2 is a side elevation view, partially in section, of a portion of the airbag inflator contained in circle A of FIG. 1.

Referring to FIGS. 1 and 2, there is shown an example of an existing airbag inflator 10 for use as part of a passenger-side or side-impact airbag module. An example of a similar airbag inflator is shown and described in U.S. Pat. No. 5,378,017 which is assigned to the assignee of the present invention. The airbag inflator 10 includes an elongated, generally cylindrical inflator housing 12 which is made of a suitable material such as aluminum, for example, and has a sidewall 14 defining a plurality of gas exhaust ports 15. An endwall 16 is located at a first end of the inflator 10 and is unitary with the sidewall 14, and a mounting stud 18 extends from the endwall. A mounting flange 20 is located at a second end of the inflator 10.

Referring to FIG. 2, an ignitor tube 24 is centrally located within the inflator housing 12, is made of a suitable material such as steel, for example, and contains a powder primary ignitor material 26 which is known to those skilled in the art and, therefore, not described in detail. An end 28 of the ignitor tube 24 is closed with a metal mesh weave or screen seal 30 and a rubber or metal open-ended tube locator cap 32. An opposite end (not shown) of the ignitor tube 24 is connected to initiating means which is positioned with respect to, or connectable to, triggering means such as a remote collision or deceleration sensor, for example. Surrounding the ignitor tube 24 is a gas generant 34 comprising a solid fuel, for example, which may be in the form of granules, disks, wafers or other selected shapes as is known to those skilled in the art. A gas cooling and filter assembly 36 surrounds the gas generant 34. Upon receiving a signal from the remote deceleration or collision sensor, the initiating means will ignite the primary ignition material 26 contained within the ignitor tube 24, which will in-turn ignite the surrounding gas generant 34 to produce inflation gas that is cooled and filtered by the gas cooling and filter assembly 36 before exiting the inflator housing 12 through the gas exhaust ports 15 to inflate an airbag cushion.

The airbag inflator 10 also includes an auto ignition device 38 which is a safety feature that automatically ignites the airbag inflator at very high temperatures, such as temperatures caused by a fire, before the airbag inflator can reach an even higher temperature at which it can explode or rupture. A shallow recess 40 is defined by the endwall 16 of the inflator housing 12 in alignment with the mounting stud 18 and adjacent the tube locator cap 32 of the ignitor tube 24. Within the recess 40 is provided the auto ignition device 38 which includes an aluminum foil retention cup 42 facing the adjacent end 28 of the ignition tube 24. Contained within the retention cup 42 by a retention disk 44 comprising a metal mesh weave or screen, is powder auto ignition material 46. Generally, the powdered auto ignition material 46 auto ignites at a desired temperature of about 350° F. (177° C.) (a temperature well below the auto ignition temperature of the gas generant 34) and creates a hot gas/particulate effluent that passes through the screen retention disk 44, strikes the adjacent end 28 of the ignitor tube 24 and passes through the metal mesh weave or screen seal 30 of the ignitor tube to ignite the primary ignitor material 26 and initiate the airbag inflator 10. As shown, the tube locator cap 32 of the ignitor tube 24 is located directly adjacent and generally touching the auto ignition device 38. This close proximity is necessary to ensure that the hot gas/particulate effluent produced by the auto ignition device 38 will reach the end 28 of the ignitor tube 24. A tight assembly tolerance is, accordingly, needed between the tube locator cap 32 and the auto ignition device 38.

Figure 3:
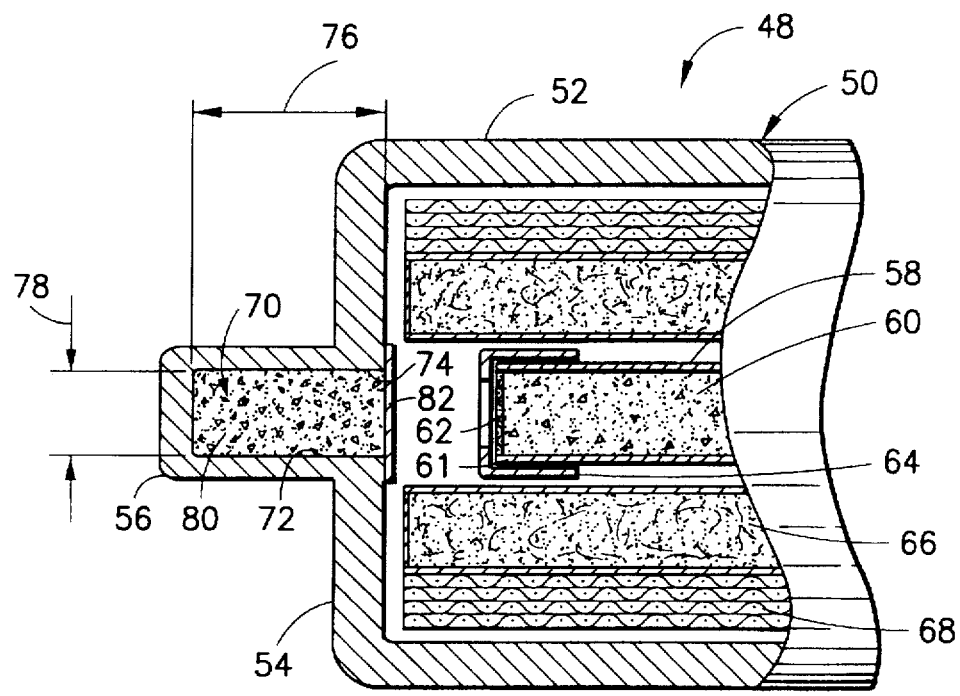
FIG. 3 is a side elevation view, partially in section, of an auto ignition system according to the present invention shown as part of an airbag inflator.

Referring to FIG. 3, an auto ignition system 70 according to the present invention is shown within an airbag inflator 48. The airbag inflator 48 is similar to the airbag inflator 10 of FIGS. 1 and 2, and includes an elongated, generally cylindrical inflator housing 50 having a sidewall 52. An endwall 54 is located at a first end of the inflator 48 unitary with the sidewall 52, and a mounting stud 56 extends from the endwall. An ignitor tube 58 is centrally located within the inflator housing 50 and contains a suitable powder primary ignitor material 60. An end 61 of the ignitor tube 58 is closed with a suitable seal 62 such as a porous metal mesh seal or a solid metal foil seal, for example, and an open-ended rubber or metal cap 64. Surrounding the ignitor tube 58 is a suitable solid gas generant 66, which may be in the form of granules, disks or wafers for example, and surrounding the gas generant is a gas cooling and filter assembly 68.

The auto ignition system 70 includes a cylindrical, elongated auto ignition chamber 72 having an open end 74. As shown, the auto ignition chamber 72 comprises a recess formed in the endwall 54 of the airbag inflator 48 and extending into the mounting stud 56. Substantially filling the recess 72 is a suitable auto ignition material 80. The auto ignition material 80 may be granule, powder or other suitable material which will auto ignite at a desired temperature of about 350° F. (177° C.) and produce a hot gas/particulate effluent. A suitable auto ignition material 80 is a nitrocellulose based composition such as IMR 3031, a product of E.I. DuPont de Nemours Co.

Closure means closes the open end 74 of the recess 72 and comprises a solid metal foil retention disk 82 which prevents the powder auto ignition material 80 from leaking out of the recess. The solid metal foil retention disk 82, which is shown with a larger thickness than actual for purposes of illustration, is secured to the endwall 54 of the inflator housing 50, covering the open end 74 of the recess 72, with an appropriate bonding material such as silicone, for example. Alternatively, the closure means can comprise a metal mesh weave retention disk, or perforated foil disk.

The auto ignition chamber or recess 72 is sufficiently elongated to create a shotgun effect for the hot gas/particulate effluent created by the auto ignition material 80 when it is auto ignited within the recess. Preferably, the recess 72 has a length 76 to width 78 ratio of at least three. By shotgun effect it is meant that the elongated recess 72 will direct the expanding hot gas/particulate effluent towards the spaced-apart end 61 of the ignitor tube 58. By shotgun effect it is also meant that the relatively small width 78 of the recess 72 will cause the expanding hot effluent to rush towards and squeeze out of the open end 74 of the recess so that the hot effluent is discharged from the recess with a greater velocity and greater force than the hot effluent produced by the existing auto ignition device 38 of FIG. 2. The shotgun effect ensures that the hot effluent will be directed at and have a great enough range to strike the end 61 of the ignitor tube 58 and pass through the seal 62 of the ignitor tube to ignite the primary ignitor material 60 and initiate the airbag inflator 48.

As shown, the end 61 of the ignitor tube 58 is spaced-apart from the open end 74 of the recess 72 and does not have to be positioned directly adjacent the auto ignition system 70 to ensure that the hot gas/particulate effluent will reach the ignitor tube. The present invention, therefore, does not require a tight assembly tolerance between the ignitor tube 58 and the auto ignition system 70 or an elaborate locator cap for positioning the end of the ignitor tube. In addition, the minimum distance required between the ignitor tube 58 and the auto ignition device 70 can be increased by increasing the length 76 of the recess 72.

The shotgun effect created by the elongated recess 72 also gives the hot effluent enough force to blow through the metal foil retention disk 82 and still remain directed towards the ignitor tube 58. The present invention, therefore, allows the use of a metal foil retention disk 82 as opposed to a metal mesh weave, or screen retention disk that could allow leakage of the fine granule auto ignition material 80.

Alternatively, providing an auto ignition material 80 that produces a hot gas/particulate effluent having large pieces of particulate will additionally allow a solid metal foil seal to be used on the end 61 of the ignitor tube 58 in place of the metal mesh weave or screen seal 62. The large pieces of particulate will pierce the metal foil seal and expose the primary ignition material 60 to the hot gas/particulate effluent. The use of a solid seal on the end 61 of the ignitor tube 58 will reduce the chances of the primary ignitor material 60 leaking.

The auto ignition system 70 can contain the same amount of auto ignition material 80 as the auto ignition device 38 of FIG. 2 and still produce a hot effluent having the desired greater range, as long as the auto ignition chamber or recess 72 is sufficiently elongated and preferably has a length 76 that is at least three times greater than the width 78 of the recess.

Figure 4:
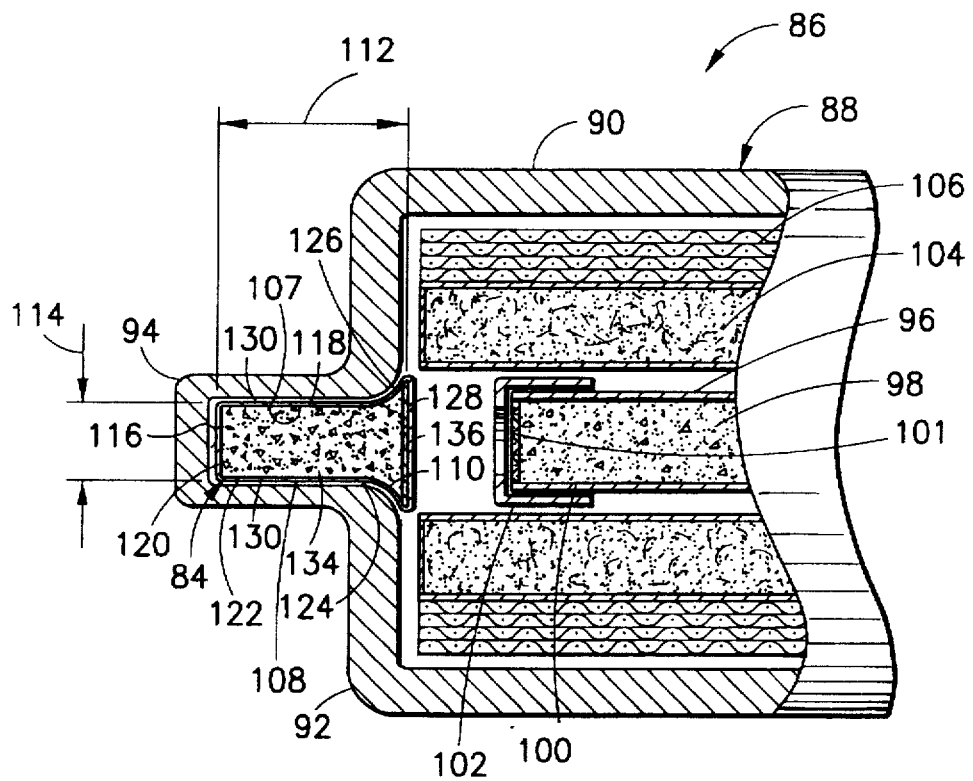
FIG. 4 is a side elevation view, partially in section, of another auto ignition system according to the present invention shown mounted within an airbag inflator.

Referring to FIG. 4, an additional auto ignition system 84 according to the present invention is shown mounted within an airbag inflator 86. The airbag inflator 86 is similar to the airbag inflator 10 of FIG. 3, and includes an inflator housing 88 having a sidewall 90. An endwall 92 is located at a first end of the inflator 86, is unitary with the sidewall 90 and a mounting stud 94 extends from the endwall. An ignitor tube 96 is centrally located within the inflator housing 88 and contains a suitable powder primary ignitor material 98. An end 100 of the ignitor tube 96 is closed with a suitable seal 101 such as a metal mesh weave seal or solid metal foil seal, for example, and an open-ended rubber or metal cap 100. Surrounding the ignitor tube 96 is a suitable gas generant 104, which may be in the form of granules, disks or wafers for example, and surrounding the gas generant is a gas cooling and filter assembly 106.

Figure 5:
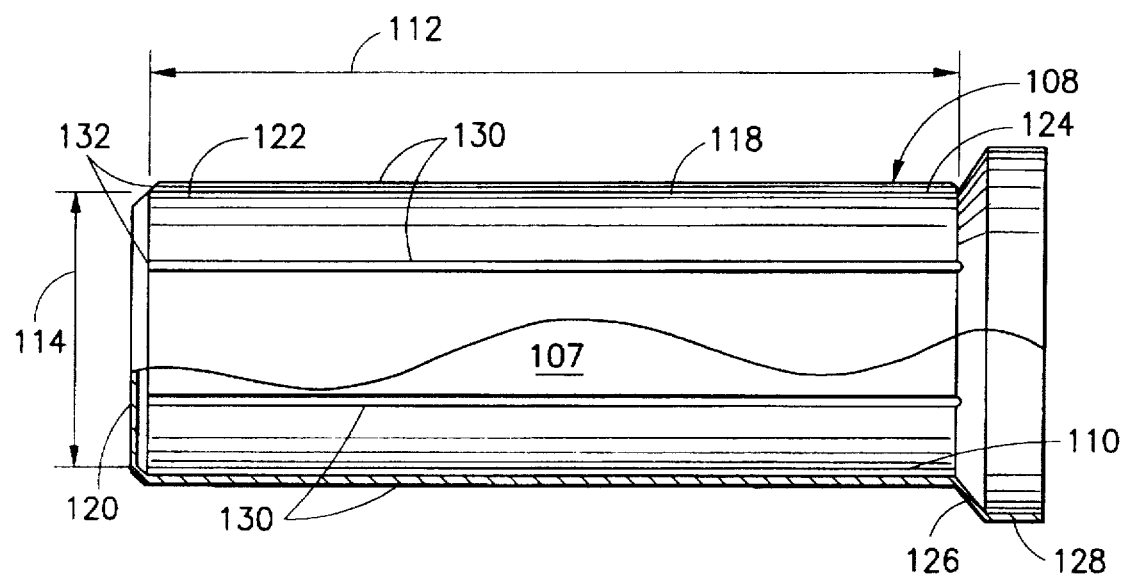
FIG. 5 is an enlarged side elevation view, partially in section, of a retainer cup of the auto ignition system of FIG. 4.
Figure 6:
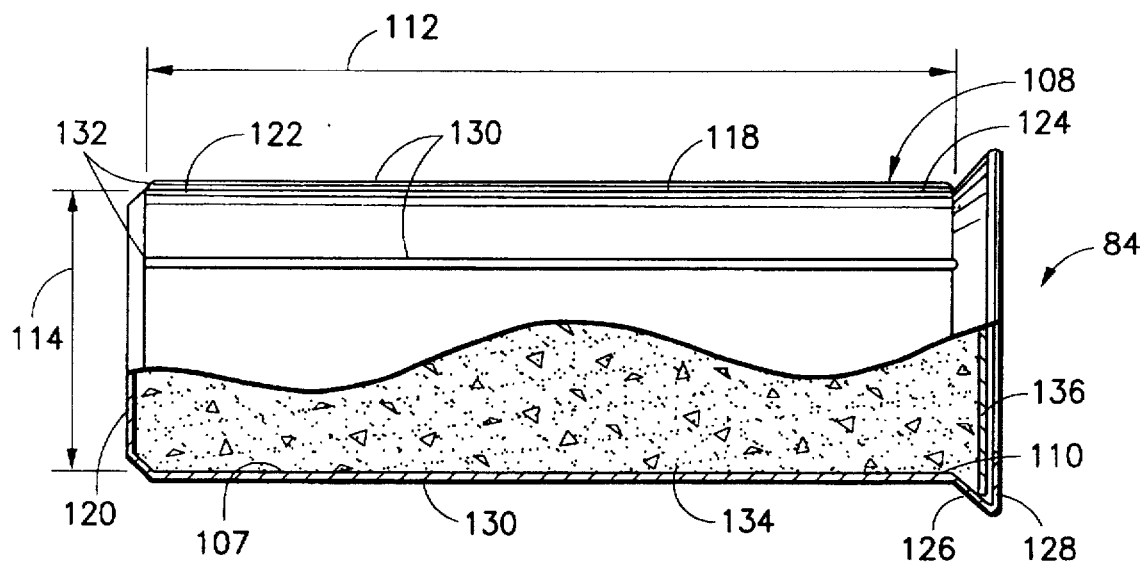
FIG. 6 is an enlarged side elevation view, partially in section, of the auto ignition system of FIG. 4.

Referring to FIGS. 4 through 6, the auto ignition system 84 includes a cylindrical, elongated auto ignition chamber 107 having an open end 110. As shown, the auto ignition chamber 107 is defined by an elongated, cylindrical retention cup 108 press-fit within a recess 116 defined by the endwall 92 of the inflator housing 88 and extending into the mounting stud 94. An example of a similar retention cup is shown and described in U.S. Pat. No. 5,378,017 which is assigned to the assignee of the present invention.

The retention cup 108 includes a sidewall 118, and an endwall 120 that closes and is preferably unitary with a first end 122 of the sidewall. A second end 124 of the sidewall 118 defines the open end 110 of the auto ignition chamber 107. A flared neck 126 extends radially outwardly from the second end 124 of the sidewall 118, and a cylindrical, bendable flange 128 extends axially from the neck so that the inner diameter of the flange is greater than the inner diameter of the sidewall.

The sidewall 118 of the retention cup 108 defines at least five, and preferably six equally spaced-apart, outwardly protruding elongated ribs 130. The ribs 130, which run axially along the retention cup 108, are for the press fit insertion of the retention cup into the recess 116 of the airbag inflator 86. In general, such press fit insertion is effected as a result of the ribs 130 having a greater outside diameter than the diameter of the recess 116. Upon the retention cup 108 being inserted into the recess 116, deformation of one or more and generally all of the ribs 130 will occur to lodge the retention cup 108 securely within the recess. The ribs 130 include a tapered lead surface 132 to facilitate insertion of the retention cup 108 within the recess 116. It is to be understood that the width of the ribs 130 can be appropriately altered so as to provide desired surface area contact between the ribs and the recess 116. The ribs 130 also provide a heat transfer path or thermal contact between the retention cup 108 and the inflator housing 88.

The retention cup 108 is preferably a one-piece construction. For example, the material of the retention cup 108 can be 0.010 inch (0.0254 cm) or more thick flat aluminum sheet stock or foil which is progressively punched to arrive at the final form. It is to be understood, however, that the retention cup 108 can be of a multi-piece construction such as wherein a flange 128 is joined to a sidewall 118, for example.

Substantially filling the auto ignition chamber 107 defined by the retention cup 108 is a suitable auto ignition material 134 similar to the auto ignition material in the auto ignition system of FIG. 3. Referring to FIG. 6 in particular, closure means closes the open end 110 of the retention cup 108 and comprises a metal foil retention disk 136 which prevents the powder auto ignition material 134 from leaking. Alternatively, the closure means may comprise a metal mesh weave retention disk. The bendable flange 128 is crimped or appropriately bent over the metal foil retention disk 136 to secure the disk over the open end 110 of the retention cup 108. Once the metal foil retention disk 136 is secured to the retention cup 108 with the auto ignition material 134 contained therein, the auto ignition system 84 becomes a self-contained unit suitable for manual or automated assembly into the recess 116 of the airbag inflator 86.

The auto ignition chamber 107 defined by the retention cup 108 is sufficiently elongated to create a shotgun effect for hot gas/particulate effluent created by the auto ignition material 134 when it is auto ignited within the cup. Preferably, the auto ignition chamber 107 has a length 112 to width 114 ratio of at least three. As explained above in greater detail, by shotgun effect it is meant that the relatively small width 114 or diameter of the auto ignition chamber 107 causes the expanding hot gas/particulate effluent to rush towards and squeeze out of the open end 110 of the chamber so that the hot effluent is discharged with a greater velocity and greater force than the effluent produced by the existing auto ignition device 38 of FIG. 2.

Figure 7:
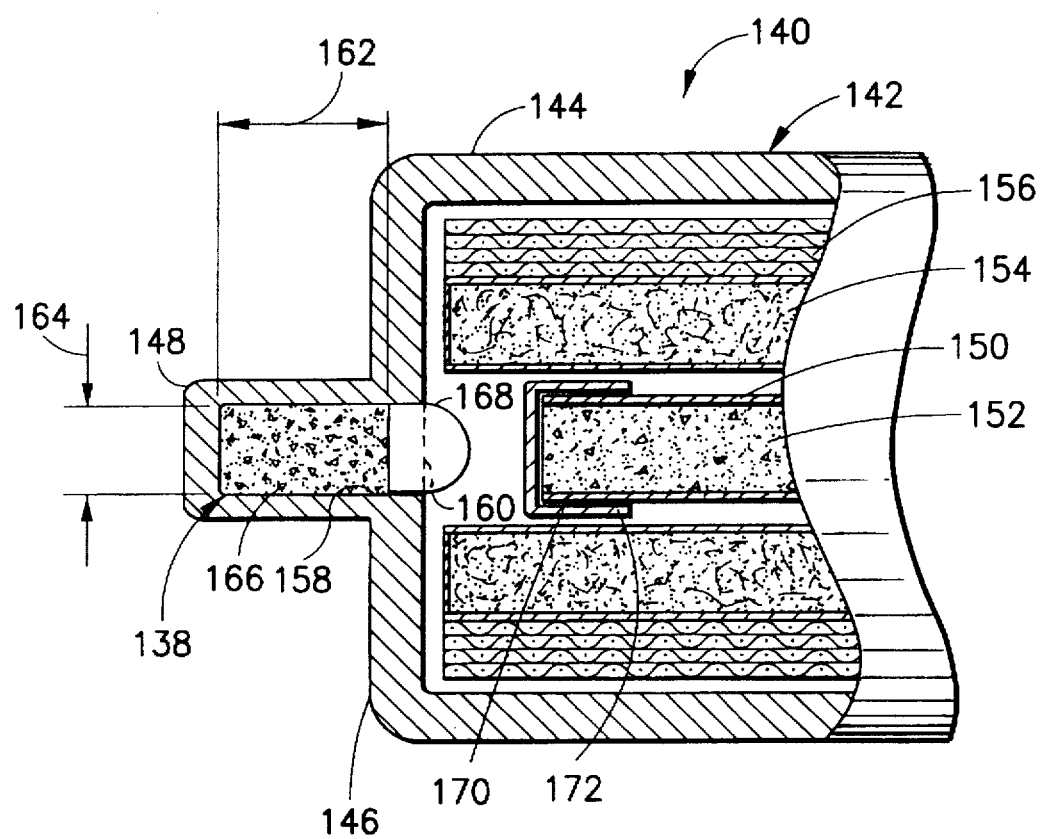
FIG. 7 is a side elevation view, partially in section, of an additional auto ignition system according to the present invention shown as part of an airbag inflator.

Referring to FIG. 7, an additional auto ignition system 138 according to the present invention is shown incorporated in an airbag inflator 140 that is similar to the airbag inflator 10 of FIG. 2, and includes an elongated, generally cylindrical inflator housing 142 having a sidewall 144. An endwall 146 is unitary with a first end of the inflator 140, and a mounting stud 148 extends from the endwall. An ignitor tube 150 is centrally located within the inflator housing 142 and contains a suitable powder primary ignitor material 152. An end 170 of the ignitor tube 156 is closed with a metal foil cap 172. Surrounding the ignitor tube 150 is a gas generant 154 in suitable form, and surrounding the gas generant is a gas cooling and filter assembly 156.

The auto ignition system 138 includes a cylindrical, elongated auto ignition chamber 158 having an open end 160. As shown, the auto ignition chamber 158 comprises a recess defined by the endwall 146 of the airbag inflator 140 and extending into the mounting stud 148. Substantially filling the recess 158 is a suitable auto ignition material 166 similar to the auto ignition material in the auto ignition systems of FIGS. 3 through 6.

The auto ignition chamber or recess 158 is sufficiently elongated to create a shotgun effect for hot gas/particulate effluent created by the auto ignition material 166 when it is auto ignited within the recess. Preferably, the recess has a length 162 to width 164 ratio of at least three. As explained above in greater detail, by shotgun effect it is meant that the relatively small width 164 or diameter of the recess 158 causes the expanding hot gas/particulate effluent to rush towards and squeeze out of the open end 160 of the recess so that the hot effluent is discharged with a greater velocity and greater force than the effluent produced by the existing auto ignition device 38 of FIG. 2.

Closure means comprising a press-fit closure plug 168 closes the open end 160 of the recess 158 and prevents the powder auto ignition material 166 from leaking out of the open end of the recess. By press-fit it is meant that the outside diameter of the press-fit closure plug 168 is slightly larger than the inside diameter of the recess 158 so that a small amount of deformation of the press-fit closure plug or the recess is required to securely position the closure plug within the open end 160 of the recess. The shotgun effect created by the sufficiently elongated recess 158 ensures that the hot gas/particulate effluent will have enough force to blow out or eject the press-fit closure plug 168. In addition, the press-fit closure plug 168 will resist being ejected until a threshold amount of pressure builds in the recess 158, contributing to the force of ejection.

The shotgun effect created by the sufficiently elongated recess 158 also ensures that the hot gas/particulate effluent produced by the auto ignition material 166 will have enough range to reach the end 170 of the ignitor tube 150 that is spaced-apart from the open end 160 of the recess 158. This reduces the assembly tolerances required between the end 170 of the ignitor tube 150 and the auto ignition system 138. In addition, the press-fit closure plug 168 will pierce the metal foil cap 172 closing the end 170 of the ignitor tube 150 upon being ejected from the open end 160 of the recess 158 to allow the hot gas/particulate effluent to enter the ignitor tube and ignite the primary ignition material 166. The press-fit closure plug 168, therefore, allows a solid cap 172, made from a suitable material such as solid metal foil, for example, to be used on the ignitor tube 150 as opposed to a metal mesh or screen seal, decreasing the chances that the fine granule primary ignitor material 152 will leak out of the ignitor tube.

Alternatively, the auto ignition system 138 could additionally include a shock sensitive charge such as a primer, for example, secured to the end 170 of the ignitor tube 150. The shock sensitive charge would be ignited by an ejected closure plug 168 striking the charge, and the charge would in-turn ignite the primary ignitor material 152.

The press-fit closure plug 168 can comprise a suitable solid inert metal such as steel, for example, or a solid pyrotechnic material such as magnesium, for example. A pyrotechnic press-fit closure plug 168 will be ignited by the ignited auto ignition material 166 at about the same time as the closure plug is ejected from the open end 160 of the recess 158, and will enhance the caloric output of the auto ignition system 138.

The press-fit closure plug 168 can also comprise a porous metal fiber or fused powder press-fit closure plug. The fiber or fused powder of such a press-fit closure plug 168 could be comprised of a suitable inert metal such as steel, for example, compressed or fused together by heating, or could be comprised of a suitable pyrotechnic material such as magnesium, for example, compressed together. The porous metal fiber or powder press-fit closure plug 168 creates a filter effect that allows a low pressure gas effluent from the auto ignition material 166 to very slowly vent out of the recess 158 rather than be trapped therein, without loss of the auto ignition material itself. Trapped effluent might possibly degrade, and shorten the useful life of, the auto ignition material 166. As opposed to a screen or mesh disk, however, the filter effect created by the porous metal fiber or powder press-fit closure plug 168 also readily retains the fine granules of the powder auto ignition material 166 within the recess 158. In addition, the metal fiber or powder closure plug 168 initially resists high temperature and pressure during ignition of the auto ignition material 166. This allows pressure to build within the recess 158, eventually causing the metal fiber or powder closure plug 168 to be ejected from the open end 160 of the recess to pierce the metal foil cap 172 on the end 170 of the ignitor tube 150.

It is important to note that although the auto ignition systems of the present invention are shown in a specific embodiment of an airbag inflator, the auto ignition systems could be used in a number of different types and styles of airbag inflators. The auto ignition systems according to the present invention, consequently, are not limited to use with the airbag inflators shown and described.

Since other requirements and environments varied to fit particular operating requirements and environments will be apparent to those skilled in the art, the invention is not considered limited to the examples chosen for purposes of illustration, and includes all changes and modifications which do not constitute a departure from the true spirit and scope of this invention as claimed in the following claims and equivalents thereto.

We claim:

1. An auto ignition system for use as part of an airbag inflator having an ignitor tube containing a primary igniter material therein, said primary igniter material being sealed in said igniter tube by a sealing means, a gas generant surrounding the igniter tube, the auto ignition system comprising:

an elongated auto ignition chamber positionable in an endwall of the airbag inflator and having an open end, the elongated auto ignition chamber adapted to be positioned within the airbag inflator with the open end facing the gas generant yet a spaced-apart distance from and not directly adjacent the sealing means on the ignitor tube;

powdered auto ignition material contained within the elongated auto ignition chamber, the powdered auto ignition material for producing a hot gas/particulate effluent upon auto igniting;

closure means closing the open end of the elongated auto ignition chamber and preventing leakage of the powdered auto ignition material from the elongated auto ignition chamber; and the elongated auto ignition chamber having a length to width ratio of at least three to create a shotgun effect for the hot gas/particulate effluent to ensure that the hot gas/particulate effluent will rupture the closure means and be directed to reach across the spaced-apart distance to the ignitor tube and pass through the sealing means on the igniter tube to ignite the primary ignition material in the igniter tube.

2. The auto ignition system of claim 1 wherein the closure means is a metal mesh weave retention disk.

3. The auto ignition system of claim 1 wherein the closure means is a solid metal foil retention disk.

4. The auto ignition system of claim 1 wherein the closure means is a solid press-fit closure plug.

5. The auto ignition system of claim 4 wherein the solid press-fit closure plug is made from an inert material.

6. The auto ignition system of claim 4 wherein the solid press-fit closure plug is made from a pyrotechnic material.

7. The auto ignition system of claim 1 wherein the closure means is a porous press-fit closure plug.

8. The auto ignition system of claim 7 wherein the porous press-fit closure plug is made from an inert material.

9. The auto ignition system of claim 7 wherein the porous press-fit closure plug is made from a pyrotechnic material.

10. The auto ignition system of claim 1 wherein the elongated auto ignition chamber comprises an elongated recess defined by an endwall of an inflator housing of the airbag inflator, the recess facing the gas generant.

11. The auto ignition system of claim 1 wherein the elongated auto ignition chamber is defined by an elongated retention cup adapted to be press-fit within an elongated recess defined by an endwall of an inflator housing of the airbag inflator, the retention cup having a sidewall, an endwall that closes a first end of the sidewall, and a second end of the sidewall defining the open end of the auto ignition chamber.

12. The auto ignition system of claim 11 wherein the elongated retention cup includes:

a flared neck extending outwardly from the second end of the sidewall transversely to the sidewall and axially away from the first end of the sidewall, and a flange axially extending from the flared neck away from the first end of the sidewall, the closure means comprising a solid metal foil retention disk positioned against the flared neck with the flange being crimped or appropriately bent over the retention disk securing the retention disk over the open end of the auto ignition chamber.

13. The auto ignition system of claim 11 wherein the elongated retention cup includes:

a flared neck extending outwardly from the second end of the sidewall transversely to the sidewall and axially away from the first end of the sidewall, and a flange axially extending from the flared neck away from the first end of the sidewall, the closure means comprising a metal mesh weave retention disk positioned against the flared neck with the flange being crimped or appropriately bent over the retention disk securing the retention disk over the open end of the auto ignition chamber.

14. The auto ignition system of claim 11 wherein the sidewall of the retention cup defines a plurality of spaced-apart, outwardly protruding, elongated, deformable ribs.

15. An airbag inflator comprising:

an elongated, cylindrical inflator housing;

an elongated ignitor tube centrally located within the inflator housing;

a primary ignitor material contained within the ignitor tube and sealed therein by sealing means;

a gas generant contained in the inflator housing concentrically surrounding the ignitor tube; and an auto ignition system including an elongated auto ignition chamber having an open end, the elongated auto ignition chamber positioned within an endwall of the airbag inflator with the open end facing and a spaced-apart distance from and not directly adjacent the sealing means of the ignitor tube, powdered auto ignition material contained within the elongated auto ignition chamber for producing hot gas/particulate effluent upon auto ignition, and closure means closing the open end of the elongated auto ignition chamber and preventing leakage of the powdered auto ignition material from the elongated auto ignition chamber, the elongated auto ignition chamber having a length to width ratio of at least three to create a shotgun effect for the hot gas/particulate effluent to rupture the closure means and be directed across the spaced-apart distance to pass-through the sealing means on the igniter tube and ignite the primary ignition material contained in the spaced-apart end of the ignitor tube.

16. The airbag inflator of claim 15 wherein the closure means of the auto ignition system is a metal mesh weave retention disk.

17. The airbag inflator of claim 15 wherein the closure means of the auto ignition system is a solid metal foil retention disk.

18. The airbag inflator of claim 15 wherein the closure means of the auto ignition system is a solid press-fit closure plug.

19. The airbag inflator of claim 18 wherein the solid press-fit closure plug of the auto ignition system is made from an inert material.

20. The airbag inflator of claim 18 wherein the solid press-fit closure plug of the auto ignition system is made from a pyrotechnic material.

21. The airbag inflator of claim 15 wherein the closure means of the auto ignition system is a porous press-fit closure plug.

22. The airbag inflator of claim 21 wherein the porous press-fit closure plug of the auto ignition system is made from an inert material.

23. The airbag inflator of claim 21 wherein the porous press-fit closure plug of the auto ignition system is made from a pyrotechnic material.

24. The airbag inflator of claim 15 wherein the elongated auto ignition chamber of the auto ignition system comprises an elongated recess defined by an endwall of the inflator housing of the airbag inflator, the recess facing the gas generant.

25. The airbag inflator of claim 15 wherein the elongated auto ignition chamber of the auto ignition system is defined by an elongated retention cup adapted to be press-fit within an elongated recess defined by an endwall of the inflator housing of the airbag inflator, the retention cup having a sidewall, an endwall that closes a first end of the sidewall, and a second end of the sidewall defining the open end of the auto ignition chamber.

26. The airbag inflator of claim 25 wherein the elongated retention cup of the auto ignition system includes:

a flared neck extending outwardly from the second end of the sidewall transversely to the sidewall and axially away from the first end of the sidewall, and a flange axially extending from the flared neck away from the first end of the sidewall, the closure means comprising a solid metal foil retention disk positioned against the flared neck with the flange being crimped or appropriately bent over the retention disk securing the retention disk over the open end of the auto ignition chamber.

27. The airbag inflator of claim 25 wherein the elongated retention cup of the auto ignition system includes:

a flared neck extending outwardly from the second end of the sidewall transversely to the sidewall and axially away from the first end of the sidewall, and a flange axially extending from the flared neck away from the first end of the sidewall, the closure means comprising a metal mesh weave retention disk positioned against the flared neck with the flange being crimped or appropriately bent over the retention disk securing the retention disk over the open end of the auto ignition chamber.

28. The airbag inflator of claim 25 wherein the sidewall of the retention cup of the auto ignition system defines a plurality of spaced-apart, outwardly protruding, elongated, deformable ribs.

* * * * *